United States Patent [19]

Oshiage et al.

[11] Patent Number: 4,853,857
[45] Date of Patent: Aug. 1, 1989

[54] RATIO CONTROL FOR CONTINUOUSLY VARIABLE TRANSMISSION

[75] Inventors: Katsunori Oshiage, Yokohama; Haruyoshi Kumura, Kamakura, both of Japan

[73] Assignee: Nissan Motor Company, Ltd., Yokohama, Japan

[21] Appl. No.: 66,048

[22] Filed: Jun. 24, 1987

[30] Foreign Application Priority Data

Jul. 1, 1986 [JP] Japan ............................... 61-152697

[51] Int. Cl.$^4$ ............................................. B60K 41/18
[52] U.S. Cl. .................................... 364/424.1; 74/866
[58] Field of Search ...................... 364/424.1, 161, 157; 79/866, 752 A, 752 D; 474/11, 12, 18, 71

[56] References Cited

U.S. PATENT DOCUMENTS

| | | | |
|---|---|---|---|
| 4,008,386 | 2/1977 | Ross | 364/161 |
| 4,509,125 | 4/1985 | Fattic et al. | 364/929.1 |
| 4,515,040 | 5/1985 | Takeuchi et al. | 74/866 |
| 4,670,843 | 6/1987 | Matsumura et al. | 364/424.1 |
| 4,718,012 | 1/1988 | Oshiage | 364/424.1 |
| 4,729,103 | 3/1988 | Oshiage et al. | 74/866 X |

FOREIGN PATENT DOCUMENTS 0140228 9/1984 European Pat. Off. .
58-39870 3/1983 Japan .

*Primary Examiner*—Eugene R. LaRoche
*Assistant Examiner*—Benny Lee
*Attorney, Agent, or Firm*—Foley & Lardner, Schwartz, Jeffery, Schwaab, Mack, Blumenthal & Evans

[57] ABSTRACT

A ratio control system for a continuously variable transmission employs proportional and integral control. When an error is greater than a predetermined value, a variation in a component of a shift command signal which is based on an integral control factor is restrained. A shift actuator is operable on the shift command signal to effect shifting in the continuously variable transmission.

11 Claims, 5 Drawing Sheets

RATIO CONTROL FOR CONTINUOUSLY VARIABLE TRANSMISSION

BACKGROUND OF THE INVENTION

The present invention relates to a ratio control for a continuously variable transmission.

U.S. Pat. No. 4,515,040 issued to Takeuchi et al. on May 7, 1985 discloses a ratio control system wherein a target engine speed that is determined based on various input signals, such as an accelerator pedal position, a vehicle speed and a shift lever position, is compared with an actual engine speed to give an engine speed error. A signal indicative of this engine speed error is fed to a shift control driver (as designated generally by the reference numeral 300 in FIG. 12 of the reference) which includes a differentiator and an integrator. Since the error indicative signal is used as inputs to the differentiator and integrator, the shift control driver produces an output that is proportional to a linear combination of the time rate-of-change of the error indicative signal and the time integral of the error indicative signal. In response to the output of the shift driver, a shift actuator effects a ratio control of a continuously variable transmission.

U.S. patent application Ser. No. 659,699 filed by Oshiage et al on Oct. 11, 1984, (now U.S. Pat. No. 4,729,103)describes a ratio control system for a continuously variable transmission wherein a target reduction ratio that is determined based on various input signals is compared with an actual reduction ratio to give a ratio error. A signal indicative of this ratio error is integrated with respect to time. The time integral of the ratio error indicative signal is multiplied with an integral gain, while the reduction ratio indicative signal is multiplied with a proportional gain. A shift actuator effects a ratio control in response to an output that is proportional to a linear combination of the time integral of the error indicative signal and the error indicative signal. In this ratio control system, if the integral gain is set to sufficiently large value for good response, an actual reduction ratio overshoots in the vicinity of a target reduction ratio to cause hunting phenomena to occur in the event a ratio error becomes large under acceleration, for example. If the integral gain is set small enough to suppress the above mentioned undesirable phenomena, the system response becomes poor.

In order to solve the above-mentioned problem, U.S. patent application Ser. No. 737,021 filed by Oshiage on May 22, 1985, (now U.S. Pat. No. 4,718,012) proposes a ratio control system for a continuously variable transmission wherein a ratio control is effected on a linear combination of the error and the time integral of the error, and the time integral is adjusted, to zero or a low level near zero when the absolute value of the error is greater than a predetermined value. Describing more specifically, when the absolute value of the error is greater than the predetermined value, the content of an integrator is cleared and the time integral action by the integrator is stopped so that a shift command signal drops immediately after the error has exceeded the predetermined value by a value that is proportional to the output of the integrator immediately before the error has exceeded the predetermined value. This measure is effective in restraining the overshoot and/or hunting phenomena. However, there are cases where the system response drops excessively. Another problem is that since the content of the integrator is cleared until the time integral by the integrator will be allowed to resume, the system response is not good after resumption of the time integral operation because the output of the integrator is reduced to zero or a low value.

An object of the present invention is to improve a ratio control system such that without any drop in system response, the occurrence of overshoot and hunting phenomena is prevented.

SUMMARY OF THE INVENTION

In order to accomplish the above-mentioned object, the present invention proposes to restrain a variation in an integral control factor rather than reducing the integral control factor to zero after an absolute value of an error has exceeded a predetermined value.

According to the one embodiment of the present invention, when the absolute value of an error is greater than a predetermined value, the time integral action by an integrator is stopped but the content of the integrator is kept at a value established therein immediately before the absolute value of the error has exceeded the predetermined value, and when the absolute value of the error subsequently drops below the predetermined value, the time integral action resumes from the content of the integrator previously kept.

DESCRIPTION OF THE EMBODIMENTS

Figure 1:
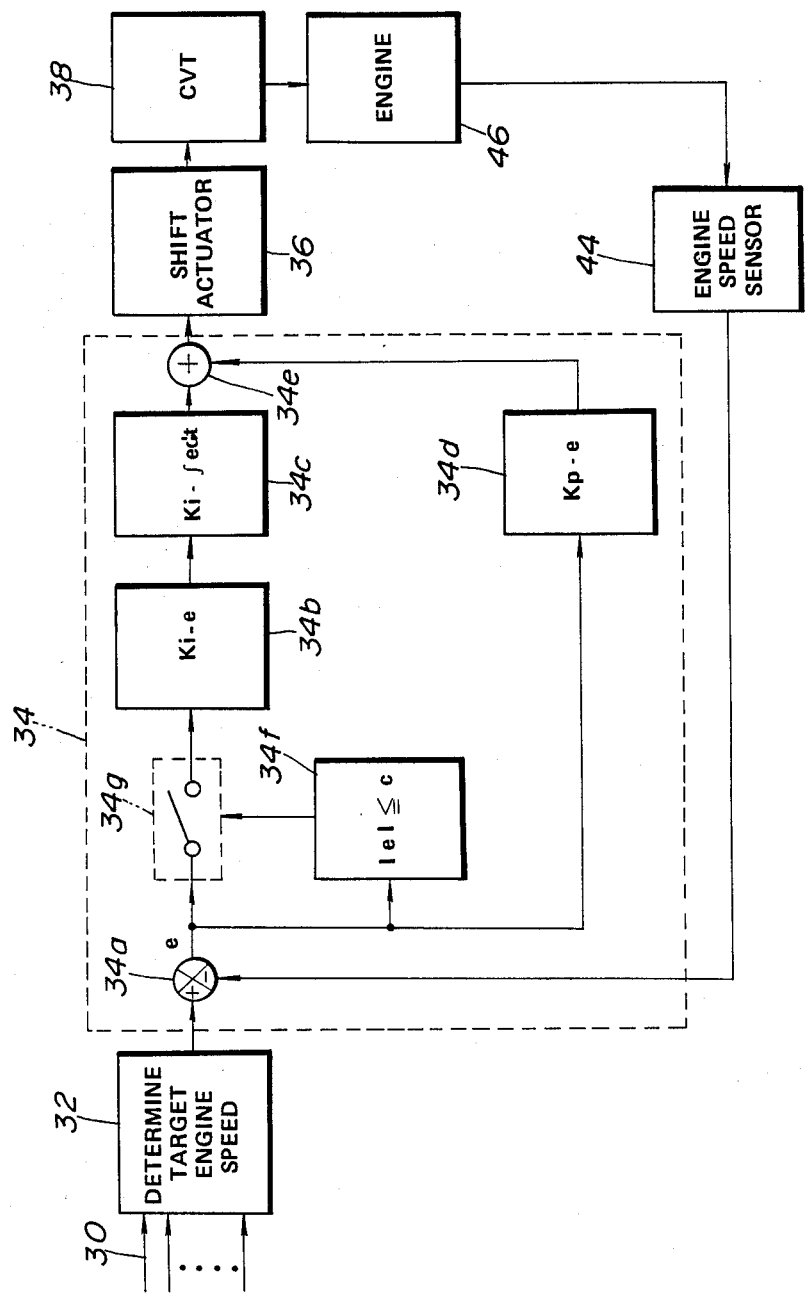
FIG. 1 is a schematic diagram showing a first embodiment according to the present invention.

Referring to FIG. 1, there are shown an engine 46, and a continuously variable transmission (CVT) 38 which is drivingly connected to the engine in a conventional manner. The transmission 38 is shiftable in reduction ratio by a shift actuator 36. Since the reduction ratio is variable continuously, a change in reduction ratio causes a change in revolution speed of the engine 46. Reference numeral 30 represents various signals indicative of operating conditions of the motor vehicle which the engine 46 is associated with. These signals 30 are fed to a block 32 where a target engine revolution speed is determined. An output signal indicative of the target engine revolution speed determined is fed to a feedback controller generally designated by reference numeral 34. The feedback controller 34 generates a shift command signal and applies same to the shift actuator 36. The shift actuator 36 is moved to a position corresponding to a reduction ratio with which the target engine revolution speed is achieved. The actual engine revolution speed is measured by an engine speed sensor 44. An output signal of the sensor 44 is fed to the feedback controller 34. If a hydraulic torque converter is disposed between the engine 46 and the continuously variable transmission 38, in order to compensate for an error due to slip occurring in the hydraulic torque converter, the engine speed sensor 44 should be arranged as to measure a revolution speed of a turbine shaft of the torque converter or an input shaft of the continuously variable transmission 38.

The signals from the block 32 and the engine speed sensor 44 are supplied to a summation point 34a where the actual engine revolution speed is subtracted from the target engine revolution speed to provide an error indicative signal e idicative of a deviation of the actual engine revolution speed from the target engine revolution speed. This error indicative signal e is supplied via a switch 34g to a multiplier 34b where the error e is multiplied with an integral gain Ki. An output signal of the multiplier 34b is supplied to an integrator 34c where the time integral of Ki.e is given. The switch 34g is actuated by a comparator 34f. The error indicative signal e is supplied to a multiplier 34d, too, where the error e is multiplied with a proportional gain Kp. Output signals of the multipliers 34c and 34d are supplied to a summation point 34e where both of the output signals are added to each other. An output signal of the summation point 34e is applied to the shift actuator 36 as the before mentioned shift command signal. The error indicative signal e is supplied also to a block 34f where the absolute value of the error e is compared with a predetermined value c. The block 34f acts on the switch 34g such that when the absolute value of e is less than or equal to the predetermined value c, the switch 34g is caused to be turned on, while when the absolute value of the error e is greater than the predetermined value c, the switch 34g is caused to be turned off. Normally when the absolute value of error e is less that or equal to the predetermined value, since the switch 34g is turned on to allow the entry of the error indicative signal e to the multiplier 34b and in turn to the integrator 34c, the time integral action by the integrator 34c continues. Under this condition, the shift command signal includes a proportional control factor indicated by the output signal or the multiplier 34d and a time integral control factor indicated by the output signal of the integrator 34c. During acceleration when the absolute value of the error e is greater than the predetermined value c, the switch 34g is turned off thereby to cut off the entry of the error indicative signal e to the multiplier 34b and the integrator 34c so that the time integral action by the integrator 34c is stopped and the output signal of the integrator 34c stops varying. As will be readily understood, the output signal of the integrator 34c keeps on indicating that content of the integrator 34c which was established immediately before the absolute value of error e has exceeded the predetermined value c. Since, under this condition, the time integral control factor of the shift command signal is invariable and equal to the value established immediately before the absolute value of e has exceeded the predetermined value c, even if the value of the integral gain Ki is set large enough to provide a sufficiently good response of the system, the occurrence of overshoot and hunting phenomena is prevented.

Figure 2:
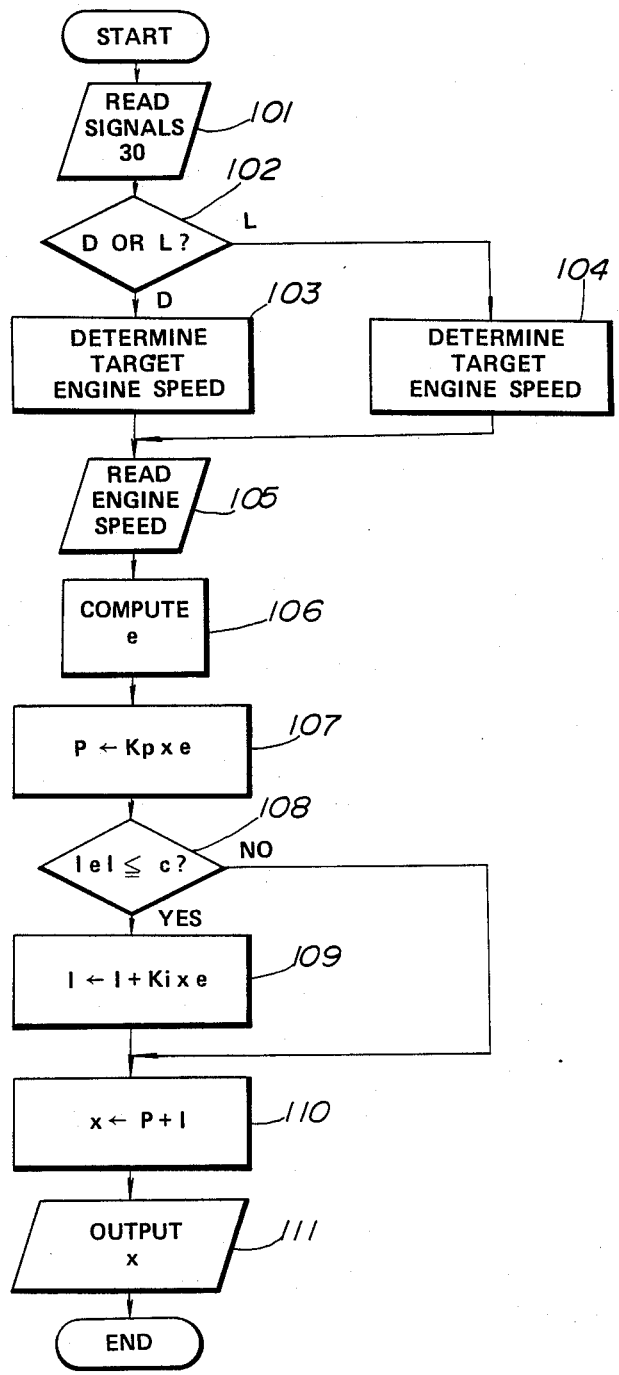
FIG. 2 is a flow chart implementing the operation performed by the first embodiment.

The above described operation of the system may be implemented by a microcomputer based control system. The control flowchart is described referring to FIG. 2. The before mentioned various signals 30 are read at a step 101. A decision is made whether a manual selector, not shown, is pointed at D (Drive) range or L (Low) range at a step 102. If the D range is selected, a target engine revolution speed is determined at a step 103 by a table look-up of a table containing target engine revolution speed values for the D range operation, while if the L range is selected, a target engine revolution speed is determined at a step 104 by a table look-up of a table containing target engine revolution speed values for the L range operation. An actual engine revolution speed is read at a step 105. An error e, i.e., a deviation of the actual engine revolution speed from the target engine revolution speed, is computed at a step 106. At a step 107, the error e is multiplied with a proportional gain Kp to give a proportional control factor P. At a comparison step 108, the absolute value of the error e is compared with a predetermined value c. If the absolute value of the error e is equal to or less than the predetermined value c, the time integral of the error e is computed at a step 109. Specifically, the error e is multiplied with an integral gain Ki and the time integral control factor I is increased by Ki×e. The time integral control factor I and the proportional control factor P is added to each other to give a shift command signal x at a step 110. This result x is outputted at a step 111. If the absolute value of the error e is greater than the predetermined value c, the time integral action is not effected and the step 109 is bypassed. Under this condition, the integral control factor I to be added to the proportional control factor P at the step 110 is equal to the value which was given at the step 110 immediately before the absolute value of the error e has exceeded the predetermined value c.

Figure 3:
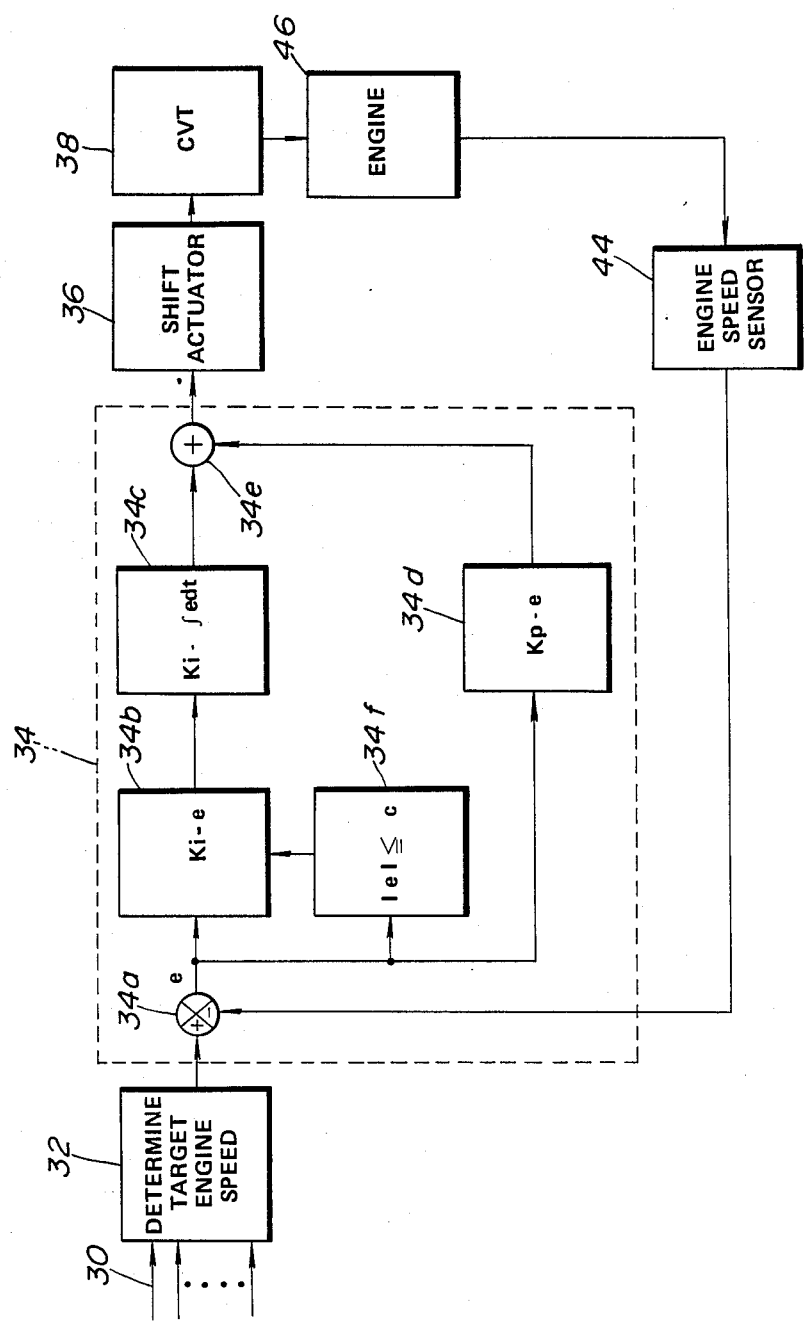
FIG. 3 is a schematic block diagram of a second embodiment according to the present invention.

The second embodiment illustrated in FIG. 3 is now described. This embodiment is substantially the same as the first embodiment illustrated in FIG. 1 except that in the first embodiment, the entry of the error e to the multiplier 34b is cut off, whereas in the second embodiment, an integral gain Ki to be multiplied with the error e at a multiplier 34b is reduced to zero or to a very small value when the absolute value of the error e is greater than a predetermined value c. Referring to FIG. 3, the multiplier 34b is designed such that the integral gain Ki is normally constant, but it can be reduced to zero or a vary small value when the absolute value of the error e is greater than the predetermined value c. Thus, when the absolute value of the error e is greater than the predetermined value c, the integral control factor indicated by the output signal of the integrator 34c stays at the same value as that established immediately before the absolute value of the error e has exceeded the predetermined value c if Ki=0. If Ki is set equal to the very small value, the integral control factor increases but at a very small rate.

Figure 4:
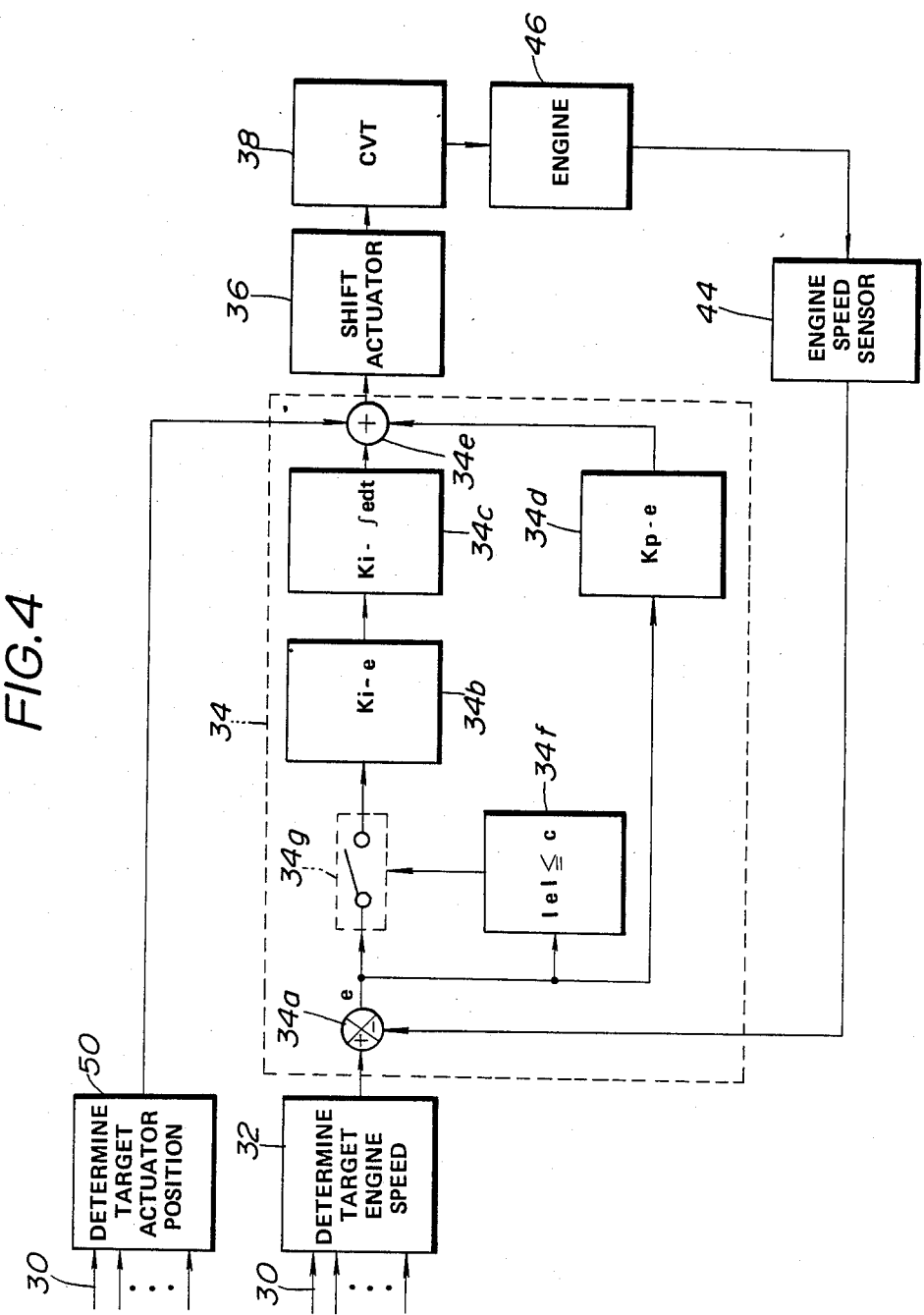
FIG. 4 is a schematic block diagram of a third embodiment according to the present invention.

Referring to FIG. 4, the third embodiment according to the present invention is described. This third embodiment is different from the first embodiment in the provision of a block 50 where a target position of shift actuator is determined based on various signals 30 and an output signal of this block 50 is added to the sum of the output signals of an integrator 34c and a multiplier 34d. Briefly, in this third embodiment, a feedforward control is combined with the feedback control as shown in FIG. 1. Since, in the third embodiment, the feedforward control factor is additionally provided, a shift actuator can be actuated quickly as compared to the previously described embodiments.

Figure 5:
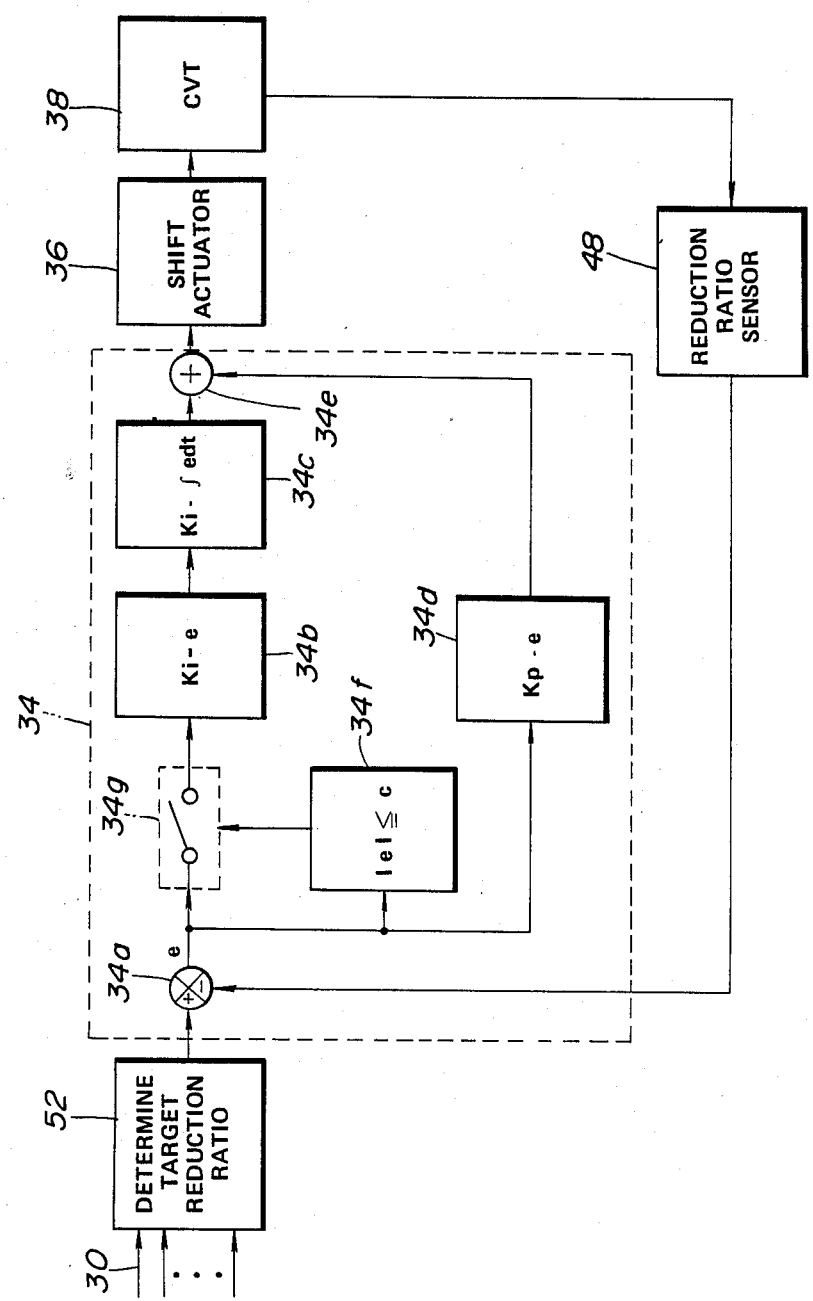
FIG. 5 is a schematic block diagram of a fourth embodiment according to the present invention.

Referring lastly to FIG. 5, the fourth embodiment is described. This fourth embodiment is different from the first embodiment shown in FIG. 1 in that although, in the first embodiment, an engine revolution speed is employed as a predetermined representative parameter which varies with a reduction ratio of a continuously variable transmission, the reduction ratio of the continuously variable transmission is used in the fourth embodiment. As shown in FIG. 5, various signals 30 are fed to a block 52 where a target reduction ratio is determined. An output signal of the block 52 is fed to a summation point 34a of a feedback controller 34. Also fed to this summation point 34a is an output signal of a reduction ratio detector or sensor 48 which determined an actual reduction ratio established in a continuously variable transmission 38. At the summation point 34a, the output signal of the reduction ratio sensor 48 is subtracted from the output signal of the block 52. An output signal e of the summation point is supplied to a multiplier 34b via a switch 34g, to a multiplier 34d, and to a block 34f where the absolute value of the signal e is compared with a predetermined value c. The output signal e is indication of an error or a deviation of the actual reduction ratio from the target reduction ratio. The processing of the signal e in the controller 34 is the same as the first embodiment shown in FIG. 1. It may well be understood that a reduction ratio may be used instead of an engine revolution speed in the second and third embodiments shown in FIGS. 3 and 4, respectively.

As will now be understood, since, when the absolute value of the error is greater than the predetermined value, the time integral action is stopped and an increase in the output signal of the integral is restrained, the occurrence of overshoot and hunting phenomena are prevented. Since the component of the shift command signal which is on the integral control factor remains without being reduced to zero or the low value, the system maintains a good response characteristic upon resumption of the time integral action.

What is claimed is:

1. A ratio control system for a continuously variable transmission for a motor vehicle having an engine which the continuously variable transmission is drivingly connected to, the continuously variable transmission having a shift actuator and being shiftable to a reduction ratio corresponding to an operating position of the shift actuator, comprising:
    means for generating a target value indicative signal indicative of a target value of a predetermined variable which varies with the reduction ratio of the continuously variable transmission;
    means for measuring an actual value of said predetermined variable and generating an actual value indicative signal indicative of said actual value measured;
    means for calculating a difference between said target value indicative signal and said actual value indicative signal and generating an error indicative signal indicative of said difference calculated;
    means for integrating said error indicative signal with respect to time to determine an integral control factor and generating an integral control factor indicative signal indicative of the integral control factor;
    means, responsive to said error indicative signal, for generating a proportional control factor indicative signal which is proportional to said error indicative signal;
    means for generating a command signal in response to said integral control factor indicative signal and said proportional control factor indicative signal, said command signal having a first component variable with said integral control factor indicative signal and having a second component variable with said proportional control factor indicative signal and controlling the shift actuator in response to said command signal; and
    means responsive to said error indicative signal for restricting said first component of said command signal from varying with said integral control factor indicative signal after an absolute value of said error indicative signal has exceeded a predetermined value such that said first component of said command signal is held at a non-zero constant after said absolute value has exceeded said predetermined value.

2. A ratio control system as claimed in claim 1, wherein said restricting means allows said first component of said command signal to resume varying with said integral control factor indicative signal when the absolute value of said error indicative signal drops below said predetermined value after said absolute value of said error indicative signal has exceeded predetermined value.

3. A ratio control system as claimed in claim 1, wherein, when said absolute value of said error indicative signal is greater than said predetermined value, said restricting means causes said first component of said command signal to be fixed to a value of said first component given immediately before said absolute value of said error indicative signal has exceeded said predetermined value.

4. A ratio control system as claimed in claim 1, wherein, when said absolute value of said error indicative signal is greater than said predetermined value, said restricting means causes said first component of said command signal to have a smaller gain than a predetermined gain which has been used immediately before said absolute value of said error indicative signal has exceeded said predetermined value.

5. A ratio control system as claimed in claim 1, wherein said integral control factor indicative signal generating means includes an integrator and said restricting means include a switch operatively disposed between said error generating means and said integrator to prevent said error indicative signal from being input to said integrator when said absolute value of said error indicative signal is greater than said predetermined value.

6. A ratio control system as claimed in claim 1, wherein said integral control factor indicative signal generating means includes a multiplier for multiplying an integral gain with said error indicative signal and an integrator for integrating an output signal of said multiplier with respect to time.

7. A ratio control system as claimed in claim 6, wherein said restricting means include a switch to prevent said error indicative signal from being input to said multiplier.

8. A ratio control system as claimed in claim 1, wherein said predetermined variable is an engine revolution speed of the engine.

9. A ratio control system as claimed in claim 1, wherein said predetermined variable is a reduction ratio of the continuously variable transmission.

10. A ratio control method for a continuously variable transmission for a motor vehicle having an engine which the continuously variable transmission is drivingly connected to, the continuously variable transmission having a shift actuator and being shiftable to a reduction ratio corresponding to an operating position of the shift actuator, the ratio control method comprising the steps of:

generating a target value indicative signal indicative of a target value of a predetermined variable which varies with the reduction ratio of the continuously variable transmission;

measuring an actual value of said predetermined variable and generating an actual value indicative signal indicative of said actual value measured;

calculating a difference between said target value indicative signal and said actual value indicative signal and generating an error indicative signal indicative of said difference calculated;

integrating said error indicative signal with respect to time to determine an integral control factor and generating an integral control factor indicative signal indicative of the integral control factor;

generating a proportional control factor indicative signal which is proportional to said error indicative signal;

generating a command signal in response to said integral control factor indicative signal and said proportional control factor indicative signal, said command signal having a first component variable with said integral control factor indicative signal and having a second component variable with said proportional control factor indicative signal and controlling the shift actuator in response to said command signal; and restricting responsive to said error indicative signal said first component of said command signal from varying with said integral control factor indicative signal after an absolute value of said error indicative signal has exceeded a predetermined value to hold said first component at a non-zero constant value.

11. A ratio control method as claimed in claim 10, wherein said restricting step allows said first component of said command signal to resume varying with said integral control factor indicative signal when the absolute value of said error indicative signal drops below said predetermined value after said absolute value of said error indicative signal has exceeded said predetermined value.

* * * * *